Patented Feb. 23, 1943

2,312,064

UNITED STATES PATENT OFFICE 2,312,064

PRODUCTION OF DIHALOGENATED SATURATED HYDROCARBONS

Hans Baehr and Wilhelm Deiters, Leuna, Germany, assignors, by mesne assignments, to General Aniline & Film Corporation, New York, N. Y., a corporation of Delaware No Drawing. Application April 22, 1939, Serial No. 269,408. In Germany May 4, 1938

4 Claims. (Cl. 260—662)

The present invention relates to the production of dihalogenated saturated hydrocarbons.

In the preparation of dihalogenated hydrocarbons by the adding on of halogens to olefines, it is already known to carry out the action of the halogens on the olefines in the presence of oxygen or saturated hydrocarbons. Even when the olefines are employed in very great dilution, undesirable polyhalogen hydrocarbons are always formed, the yield and the purity of the desired dihalogenated hydrocarbons being impaired.

We have now found that dihalogenated hydrocarbons are obtained in very good yields, while avoiding overhalogenation, in other words formation of tri- or polyhalogen compounds by substitution, to a large extent by treating olefines in particular aliphatic or cycloaliphatic monoolefines with halogen in the presence of gaseous hydrogen halide. The hydrogen halide is preferably derived from the halogen used for the halogenation. We desirably use chlorine as the halogen, although we may use bromine.

The dihalogen hydrocarbons thus obtained are usually so pure that they may be used for further reactions without further purification. For the adding on of halogen according to this invention there may be used both pure aliphatic olefines, such as ethylene, propylene, butylenes and di-isobutylene, and mixed aliphatic-aromatic olefines, such as styrene or propenylbenzene, and cyclic olefines, as for example cyclohexene.

In the preparation of the dihalogen hydrocarbons, it is preferable first to mix the gaseous halogen with gaseous hydrogen halide and to allow this mixture then to act on the olefine under the usual conditions, preferably in the gas phase. The hydrogen halide may, however, be mixed with the gaseous olefine and this mixture then treated with gaseous halogen, or also both reactants may be mixed with hydrogen halide before the adding on process.

The adding on may be also carried out with liquid olefines. The temperatures to be maintained usually lie below about 100° down to about −30° C. Higher temperatures are preferably avoided because otherwise the dihalogen hydrocarbons are readily further halogenated. The halogen is generally speaking used in about the amount calculated upon the amount of the olefine or a smaller amount. The usual ratio of olefine to chlorine used, therefore, ranges from about 0.05 to 0.98 molecular proportion of chlorine for each molecular proportion of the olefine. The process may also be carried out with an excess of halogen, calculated on the olefine, for example when saturated hydrocarbons are present. In any case the amount of halogen should not exceed the amount equimolecular to the total amount of hydrocarbons present in the mixture to be halogenated. The reaction may also be carried out under increased or reduced pressure if desired. There may be other gases present in the reaction mixture as well as hydrogen halide, as for example carbon dioxide, nitrogen or oxygen or, as already described, saturated hydrocarbons.

It is preferable to perform the halogenation in the presence of at least one molecular proportion of the hydrogen halide for each molecular proportion of the olefine. The amount of hydrogen halide may be up to 10 or 15 times higher than that of the olefine.

The olefines used for the preparation of dihalogen hydrocarbons according to this invention may be prepared in any way. For example the new process is suitable for the preparation of dichlor hydrocarbons from monochlor-hydrocarbons, the latter first being converted into olefines and hydrogen chloride by treatment with catalysts splitting off hydrogen chloride or by heating to high temperatures, the said mixture then being treated with chlorine at temperatures below 100° C.

The new method may also be used with advantage for the preparation of dichlor hydrocarbons from paraffin hydrocarbons. The latter are first dehydrogenated to olefines, for example by treating them with chlorine at elevated temperature. The mixture containing hydrogen chloride thus obtained is first cooled to ordinary temperature in order to separate the chlorine compounds formed as by-products, and then directly mixed with an amount of chlorine sufficient for the chlorination of the olefines and led through a cooled tube, the dichlor hydrocarbons formed thus being separated in the liquid form.

The new process may also be used for the preparation of dihalogen compounds from olefines which are present in admixture with saturated hydrocarbons. Thus for example dichlorbutane may be prepared in the following manner; butane is first dehydrogenated with the aid of chlorine by reaction at elevated temperatures. A part of the butane is thus converted into butylene and a part into chlorbutane, while a part remains unchanged, so that after cooling and separating the chlorbutane, a mixture of butane with butylene and hydrogen chloride is obtained. This mixture is then reacted in the cold with an excess of chlorine, with reference to the amount of butylene present in the mixture, the butylene thus being converted into dichlorbutane and a part of the butane into chlorbutane. Trichlorbutane is not formed by this method. The dichlorbutane and the monochlorbutane are then separated from the gaseous hydrogen chloride and butane. The chlorbutane from the first dehydrogenation stage is mixed with the chlorbutane obtained in the second stage and converted in known manner by splitting off hydrogen chloride into a mixture of butylene and hydrogen chloride. This mixture together with the hydrogen chloride-butane mixture of the second stage may be reacted with a corresponding amount of chlorine in a cooled tube, the butylene being converted into dichlorbutane and the butane to a great extent into monochlorbutane. In this way it is possible to free the gaseous hydrogen chloride obtained in the dehydrogenation of saturated hydrocarbons to a great extent from hydrocarbons.

The hydrogen halide obtained in the said process after the formation of the dihalogen hydrocarbons may be used as a diluent in further adding on of halogen; it may also be used for chemical reactions, as for example for the preparation of alkyl halides by the adding on of hydrogen halide to olefines in the gas phase. Finally it may be liquefied or dissolved in water and converted into chlorine by electrolysis or according to the Deacon process. By using the said process in conjunction with the dehydrogenation of saturated hydrocarbons it is thus possible not only to dispense with the separation of the hydrogen halide formed and to carry out the adding on of halogen directly, but also to make use of the favorable action of the hydrogen halide in the formation of dihalogen hydrocarbons and finally to exploit the hydrogen halide industrially in a simple way.

The following examples will further illustrate how this invention may be carried out in practice but the invention is not restricted to these examples.

Example 1

100 liters of gaseous hydrogen bromide per hour are led at about 15° C. through liquid bromine, about 30 liters of bromine vapor thus being entrained by the hydrogen bromide. This mixture then has added to it 30 liters per hour of propylene at ordinary temperature in a tube cooled with water. From the lower part of this tube there may be withdrawn per hour 244 grams of a liquid boiling between 140° and 145° C. and consisting mainly of dibromopropane. The yield is about 95 per cent of the amount of propylene introduced. The hydrogen bromide remaining after the separation of the propylene bromide is returned in a cycle and serves again for dilution of the bromine.

Example 2

A mixture of 10 cubic meters of butane and 6 cubic meters of chlorine prepared at 200° C. is led per hour through a tube heated to 400° C., the reaction taking place with a rise in temperature to 550° C. By cooling the resulting gas mixture to about 0° C., 12 kilograms of butyl chloride separate per hour in the liquid state; the non-liquefied gas mixture contains about 3.5 cubic meters of butylene, 3 cubic meters of butane and 9 cubic meters of hydrogen chloride, 3.5 cubic meters per hour of chlorine are added to this gaseous mixture at ordinary temperature and then it is led through a mixing nozzle into a spiral tube of 24 millimeters internal width around which water flows. From the lower end of the tube there flow per hour about 18.5 kilograms of butylene chloride in a liquid state. The residual gas, containing about 3.3 cubic meters of butane and 8.7 cubic meters of hydrogen chloride, is liquefied by the use of pressure and distilled under about 15 atmospheres, the hydrogen chloride being allowed to leave the top of the column in a gaseous form while butane almost free from hydrogen chloride is recovered from the lower part. This may be returned directly to the dehydrogenation apparatus for further reaction.

Example 3

130 kilograms of normal butyl chloride are vaporized per hour and the vapors are led through a tube heated to 500° C., the butyl chloride thus being split up into butylene and hydrogen chloride. It is cooled to about 0° C., 64 kilograms of unconverted butyl chloride thus being separated in liquid form; the residual gas contains 16.5 cubic meters of butylene and 16.5 cubic meters of hydrogen chloride. To this mixture there is added at 20° C. a mixture consisting of 83.5 cubic meters of hydrogen chloride and 16.5 cubic meters of chlorine and it is led at a speed of 5 meters per second through a spiral cooled in ice-water. From the lower part of the spiral, about 84 kilograms of liquid dichlorbutane run. The residual gas consists almost entirely of hydrogen chloride. 84 cubic meters thereof are returned again in a cycle for the adding on of chlorine, while the remaining 16 cubic meters are converted according to the Deacon process into chlorine which may be used for the preparation of butyl chloride from butane and chlorine.

What we claim is:

1. A process for the production of dihalogenated saturated hydrocarbons which consists in bringing an olefinic hydrocarbon into contact with at most an equimolecular amount of a halogen of the group consisting of chlorine and bromine at temperatures below 100° C., at least one of the starting materials being admixed with a gaseous hydrogen halide of the group consisting of hydrogen chloride and hydrogen bromide, the total amount of hydrogen halide present in the reaction mixture being at least equimolecular to that of the olefinic hydrocarbon present.

2. A process for the production of dichlor butane which consists in bringing butylene into contact with at most an equimolecular amount of chlorine at temperatures below 100° C., at least one of the starting materials being admixed with gaseous hydrogen chloride, the total amount of hydrogen chloride present in the reaction mixture being at least equimolecular to that of the butylene present.

3. A process for the production of dichlor butane which consists in bringing gaseous butylene into contact with at most an equimolecular amount of gaseous chlorine at temperatures below 100° C., at least one of the starting materials being admixed with gaseous hydrogen chloride, the total amount of hydrogen chloride present in the reaction mixture being at least equimolecular to that of the butylene present.

4. A process for the production of dichlor butane which consists in bringing a gaseous mixture of butylene and butane into contact with an amount of gaseous chlorine which is at most equimolecular to the amount of butylene at temperatures below 100° C., at least one of the starting materials being admixed with gaseous hydrogen chloride, the total amount of hydrogen chloride present in the reaction mixture being at least equimolecular to that of the butylene present.

HANS BAEHR.
WILHELM DEITERS.